United States Patent Office 2,719,783
Patented Oct. 4, 1955

2,719,783

LOW VOLATILE COMPOSITIONS FOR CONTROLLING VEGETATION GROWTH

Gustave K. Kohn, Berkeley, Calif., assignor to California Spray-Chemical Corporation, Richmond, Calif., a corporation of Delaware No Drawing. Application April 14, 1951, Serial No. 221,121

8 Claims. (Cl. 71—2.5)

This invention relates to an improved composition for use in the control of vegetation growth, and particularly to a low volatile herbicidal composition adapted for selective control and destruction of undesirable plant material.

While 2,4-dichlorophenoxyacetic acid has been extensively used in the form of its salts, esters, amides, etc., in the formulation of herbicidal compositions, a number of difficulties have been encountered in the application of these composition which have rendered this material impractical and even injurious in certain usage. Herbicidal compositions employing the foregoing derivatives of 2,4-dichlorophenoxyacetic acid as the active ingredient are adapted for selective control of broad-leaf plants, notably the succulent stem variety, in narrow-leaf plant environment, and particularly the destruction of weeds associated with growing cereal crops. These compositions are normally applied either by spraying or dusting under varying conditions, depending upon the area to be treated.

One of the principal difficulties associated with the application of these compositions is the fact that the conventional ester derivatives of 2,4-dichlorophenoxyacetic acid possess a high vapor pressure and under the varied conditions of field usage, appreciable quantities of the composition may be carried either by drift or diffusion into proximal areas containing valuable plant crops susceptible to the phytocidal ingredient. In such instances, which are normally associated with improper application or unexpected changes in climatic conditions, the advantages to be gained in the destruction of weeds in one crop may be considerably overbalanced by the destruction of an adjacent or proximal susceptible cash crop.

It has now been found possible to overcome these difficulties in formulation and application of herbicidal compositions by employing as the active ingredient a particular ester of 2,4-dichlorophenoxyacetic acid which possesses an exceptionally low volatility. This particular ester, namely, the tetrahydrofurfuryl ester of 2,4-dichlorophenoxyacetic acid, not only has the advantage of low volatility, but also allows the production of concentrates of maximum parent acid concentration. This latter feature is an important practical advantage in field application of the herbicidal compositions, where formulation effectiveness is measured in terms of parent acid concentration per gallon of concentrate.

Various attempts have been made to reduce the high volatility of the parent acid hormone by employing derivatives and, in particular, esters of high molecular weight such as the polyalkoxyalkyl esters. Although these high molecular weight esters may possess a sufficiently low volatility, such reduction in vapor pressure is accomplished at a material sacrifice of parent acid content and, accordingly, phytocidal activity. In contrast thereto, the tetrahydrofurfuryl ester of 2,4-dichlorophenoxyacetic acid allows the formation of low volatile herbicidal compositions as well as concentrates containing a maximum parent acid concentration.

The tetrahydrofurfuryl ester of 2,4-dichlorophenoxyacetic acid is a viscous liquid boiling at 197–198° C. at 2–3 mm. Hg with slight decomposition and having a refractive index of 1.5395 at 27° C. It is stable over a considerable temperature range and possesses a negligible animal toxicity factor. This ester may be prepared by condensation of 2,4-dichlorophenoxyacetic acid and tetrahydrofurfuryl alcohol in the presence of a dehydrating esterification agent such as phosphoric acid, p-toluene sulfonic acid, etc. For optimum yields of ester, it is generally preferable to employ a slight molar excess of the alcohol and conduct the condensation in the presence of a water-immiscible solvent. Additionally, it is desirable to employ a weakly acidic esterification agent in order to avoid any appreciable polymerization and resinification of the tetrahydrofurfuryl alcohol. The resulting low volatile ester is easily soluble in the majority of organic solvents and substantially insoluble in water.

The ester hormone of the invention may be formulated in the form of a dust or liquid spray composition. Thus, the ester may be compounded with a porous, inert, finely divided solid carrier such as talc, soapstone, frianite, pyrophylite, Attapulgus clay, chalk, volcanic ash, etc., and preferably in conjunction with a water-soluble and/or oil-soluble emulsifying or wetting agent. The dusting compositions may be formulated as a concentrate for field dilution with additional powdered carrier, or compounded in the form of a wettable powder which may be diluted to form a stable emulsion with water or partially refined mineral oil.

Although the dust formulations may be used for both general and selective control of vegetation growth, the desirable features of the subject ester hormone are more pronounced in the formulation and application of liquid spray compositions. Broadly, this ester may be applied as a dispersion in a convenient liquid carrier. The dispersion may range from a substantially molecular dispersion or solution when employing organic solvents or liquids with a high solvent power to a physical dispersion or emulsion when water is used as the primary carrier. In either event, it is considered desirable to incorporate with the phytocidal ester a wetting, dispersing, or emulsifying agent in the formulation of the herbicidal concentrate. These surface-active agents may be any of the conventional ionic or non-ionic types of wetting, dispersing, or emulsifying agents, and for certain types of application mixtures of ionic and no-ionic surfactants are preferred. The choice of the emulsifying agent or mixture of agents as well as the amount employed is largely dependent upon its ability to provide a stable emulsion of the concentrate under the conditions and amount of dilution to be employed for the field application.

For optimum absorption of the 2,4-dichlorophenoxyacetic acid ester on the plant surfaces, it has been determined that dilution in spray oils or conventional petroleum oils such as diesel oil is desirable, and the herbicide may be applied directly from such dilutions or subsequently emulsified in water. In order to facilitate the solution or emulsification in the petroleum oils, the ester concentrate is preferably compounded with a mutual solvent. These solvents include the aliphatic esters and ketones and the aromatic hydrocarbons and oxygen-containing derivatives such as isopropyl acetate, methyl isopropyl ketone, cyclohexanone, xylene, cresylic acids (mixed cresols and xylenols), methyl naphthalenes, etc.

Although previous reference and emphasis have been made with respect to the tetrahydrofurfuryl ester of 2,4-dichlorophenoxyacetic acid as the sole active component of the plant control composition, it may be desirable to compound a formulation which includes other acid hormones or even other derivatives of 2,4-dichlorophenoxyacetic acid in conjunction therewith. Thus, for certain types of application, it has been found advantageous to incorporate a derivative of 2,4,5-trichlorophenoxyacetic acid with the ester of the invention and obtain an herbicidal composition which is effective against broad-leaf plants possessing both succulent and woody stems. Other combinations of active components such as insecticides and fertilizers are contemplated with the purview of the invention, providing the tetrahydrofurfuryl ester of 2,4-dichlorophenoxyacetic acid is present in the composition.

When applied in minute concentrations in simple dust or aqueous dispersions, the present ester may be used as a plant stimulant to encourage vegetative or root growth or germination of seed. However, of primary importance is the application of this ester in phytocidal concentrations of at least 0.04% by weight of parent acid. The optimum concentration of the applied herbicide or the required amount of dilution of the concentrate is dependent upon numerous factors, such as type of application, method of applying, composition of concentrate, etc. For general field application the concentration of parent acid used is normally between 0.04 and 0.10% by weight when sprayed from field rigs and between 1.5 and 4.0% by weight when sprayed from an airplane. These ranges of final concentrations are merely representative for the more conventional types of application, and higher concentrations may be required to eradicate less susceptible plant material.

In the formulation of concentrates, the ester of this invention permits the compounding of up to about 6 lbs. of parent acid per gallon of concentrate with adequate petroleum oil solubility and satisfactory emulsibility in all dilutions. For practical purposes, concentrates containing from 3 to 4 lbs. of parent acid per gallon are conveniently employed. These concentrates may be diluted directly in either oil or water to the prescribed field concentrations, or preferably the concentrate is first diluted with a petroleum oil such as diesel oil and then emulsified with water to the final dilution. The initial oil dilution has been found to promote absorption and penetration into the plant membrane and thereby facilitate translocation of the phytocidal ingredient.

The following examples illustrate a few representative formulations of the tetrahydrofurfuryl ester of 2,4-dichlorophenoxyacetic acid which are useful as herbicidal compositions. It is to be understood that the subject invention is not to be construed as limited to the specific examples.

Example I

A phytocidal concentrate containing 3.3 lb. of parent acid per gallon was formulated as follows:

|  | Pounds | Gallons |
|---|---|---|
| Tetrahydrofurfuryl ester of 2,4-dichlorophenoxyacetic acid (90.7%) | 5.09 | 0.475 |
| Igepal CA 300* | 0.354 | 0.40 |
| Alkyl benzyl trimethyl ammonium chloride (30% solution in xylene) | 0.162 | 0.022 |
| Technical xylene | 3.303 | 0.463 |
|  | 8.912 | 1.000 |

*Alkyl aryl polyethylene glycol ether.

Example II

The concentrate of Example I is diluted in accordance with the proportions 3½ parts of concentrate with 8 parts diesel oil and 24 parts of water to produce an airplane spray concentrate which may be used as such or in further dilution in water up to 1:100. The resulting emulsified herbicidal composition is used in the airplane spraying of wheat, corn, and rice fields to eradicate such undesirable broad-leaf plants as mustard, rag weed, wild radish, thistle, plantain, shepherd's purse, etc.

Example III

The concentrate of Example I is diluted directly with water in the proportions of one part of concentrate to 800 parts of water. The resulting composition is used in field power rigs for the same purposes as outlined in Example II. In addition, 1:800 dilution in either water or a petroleum oil such as diesel oil may be used in a power sprayer to eradicate water hyacinths from irrigation ditches, canals, and streams.

Example IV

The following formulation illustrates the preparation of a concentrate containing 2 lbs. of 2,4-dichlorophenoxyacetic acid and 2 lb. of 2,4,5-trichlorophenoxyacetic acid per gallon.

|  | Pounds | Gallons |
|---|---|---|
| Tetrahydrofurfuryl ester of 2,4-dichlorophenoxyacetic acid (90.7%) | 3.051 | 0.285 |
| Tetrahydrofurfuryl ester of 2,4,5-trichlorophenoxyacetic acid (93%) | 2.869 | 0.253 |
| Igepal CA 300 | 0.354 | 0.04 |
| Alkyl benzyl trimethyl ammonium chloride (30% solution in xylene) | 0.165 | 0.022 |
| Technical xylene | 2.856 | 0.4 |
|  | 9.295 | 1.000 |

Example V

The concentrate of Example IV was diluted in the preparation of an airplane spray concentrate in the following proportions: 3 parts of concentrate, 8 parts of diesel oil, 24 parts of water. This airplane concentrate may be used per se or in further water dilution. The mixed ester concentrate is particularly adapted for field application where broad-leaf woody stem plants, such as poison oak, wild raspberry, brambles, etc. are prevalent. The combination of the two phytocidal components has been found to possess a greater phytocidal activity than would be normally expected from like concentrations of the individual components.

Variations in the formulation of the concentrates of Examples I and IV have been made without affecting to any great degree the efficiency of the concentrate; thus, in place of the combination of ionic and non-ionic emulsifiers set forth in the exemplary concentrates, individual ionic emulsifiers have been used with satisfactory results. These emulsifiers are Armeen TD acetate and the sodium and triethanolamine salts of alkyl aryl sulfonic acids. The sodium and triethanolamine alkyl aryl sulfonates have also been used with the non-ionic emulsifier Igepal CA 300. Additionally, in the formulations of Examples I and IV, Triton X 100 and 155 have been substituted for the Igepal emulsifier.

Example VI

As an illustration of the non-volatility of herbicidal compositions containing the tetrahydrofurfuryl esters of 2,4-dichlorophenoxyacetic acid, the following test was conducted. Young tomato plants about 2 to 3 inches high were selected as the susceptible plant material. The comparison was conducted on a concentrate containing the tetrahydrofurfuryl esters of 2,4-dichlorophenoxyacetic acid and 2,4,5-trichlorophenoxyacetic acid similar in composition to the concentrate of Example IV. This concentrate contained the equivalent of 2 lb. of each parent acid per gallon. In comparison, a concentrate in a xylene solvent of the isopropyl ester of 2,4-dichlorophenoxyacetic acid with a concentration equivalent to 4 lb. of parent acid per gallon was used. In the test, a plant and an open-cap vial containing a few ml. of the herbicidal concentrate were placed under an inverted 9 liter bell jar. The plants were well watered at the start of the experiment and every day thereafter by quickly lifting up the jar and adding water. The temperature in the greenhouse during the experimental period varied between a maximum of 88° F. and a minimum of 50° F., with an average of around 74° F. The tomato plant tested with the isopropyl ester of 2,4-dichlorophenoxyacetic acid began to droop within five hours after the start of the experiment, and the test plant used in conjunction with the ester concentrate of the invention maintained a healthy growth even after six days of observation.

Obviously, many modifications and variations of the invention as hereinbefore set forth may be made without departing from the spirit and scope thereof, and only such limitations should be imposed as are indicated in the appended claims.

I claim:

1. A herbicidal composition comprising a phytotoxic concentration of the tetrahydrofurfuryl ester of 2,4-dichlorophenoxyacetic acid and an emulsifying agent uniformly dispersed in a liquid carrier.

2. A herbicidal composition comprising a phytotoxic concentration of the tetrahydrofurfuryl ester of 2,4-dichlorophenoxyacetic acid as an active component compounded with an oil-miscible solvent and an emulsifying agent.

3. A herbicidal composition comprising a phytotoxic concentration of the tetrahydrofurfuryl ester of 2,4-dichlorophenoxyacetic acid as an active component compounded with a xylene solvent and an emulsifying agent.

4. A phytocidal concentrate adapted for dilution in oil or water which comprises the tetrahydrofurfuryl ester of 2,4-dichlorophenoxyacetic acid present in amounts equivalent to from about 1 to 6 lbs. of parent acid per gallon of concentrate compounded with an oil-miscible solvent and an emulsifying agent.

5. An herbicidal composition containing as an active component the tetrahydrofurfuryl ester of 2,4-dichlorophenoxyacetic acid, said active component being present in phytocidal concentration of from 0.04–4% by weight.

6. A method of selectively killing undesirable broadleaf plant growth which comprises applying to said undesirable plant growth a liquid spray composition containing the tetrahydrofurfuryl ester of 2,4-dichlorophenoxyacetic acid present in phytocidal concentration and combined with an emulsifying agent and a liquid carrier.

7. A herbicidal composition comprising an inert carrier and the tetrahydrofurfuryl ester of 2,4-dichlorophenoxyacetic acid, said ester being present in the composition in phytocidal concentration.

8. A method of selectively killing broad leaf plant growth without substantial damage to proximal desirable broad leaf plant growth which comprises applying to said undesirable plant growth a phytocidal amount of the tetrahydrofurfuryl ester of 2,4-dichlorophenoxyacetic acid.

References Cited in the file of this patent

UNITED STATES PATENTS

| | | |
|---|---|---|
| 2,390,941 | Jones | Dec. 11, 1945 |
| 2,543,397 | Allen | Feb. 27, 1951 |

OTHER REFERENCES

"Science," Sept. 10, 1948, pages 278 and 279.